United States Patent [19]

Sasaki

[11] Patent Number: 4,786,537

[45] Date of Patent: Nov. 22, 1988

[54] SELF-WEEDING DRY TRANSFER ARTICLE

[75] Inventor: Makoto Sasaki, Shizuoka, Japan

[73] Assignee: Minnesota Mining and Manufacturing Company, St. Paul, Minn.

[21] Appl. No.: 925,730

[22] Filed: Oct. 30, 1986

[51] Int. Cl.[4] .......................... H61F 31/02; B32B 3/00

[52] U.S. Cl. .......................................... 428/40; 428/41; 428/172; 428/204; 428/220; 428/323; 428/352; 428/914

[58] Field of Search ................... 428/40, 41, 172, 173, 428/204, 206, 220, 323, 352, 354, 914

[56] References Cited

U.S. PATENT DOCUMENTS

| | | | |
|---|---|---|---|
| Re. 24,906 | 12/1960 | Ulrich | 206/59 |
| 4,075,049 | 2/1978 | Wood | 156/220 |
| 4,454,179 | 6/1984 | Bennett et al. | 428/41 |
| 4,514,457 | 4/1985 | Sasaki | 428/204 |
| 4,640,727 | 2/1987 | Janssen | 156/240 |
| 4,664,735 | 5/1987 | Pernicano | 156/240 |

FOREIGN PATENT DOCUMENTS

| | | | |
|---|---|---|---|
| 492847 | 5/1953 | Canada | 428/914 |
| 1551248 | 8/1979 | United Kingdom . | |

*Primary Examiner*—John E. Kittle
*Assistant Examiner*—P. J. Ryan
*Attorney, Agent, or Firm*—Donald M. Sell; Gerald F. Chernivec; Robert H. Jordan

[57] ABSTRACT

A dry transfer article comprising an adhesive layer, a graphic pattern contained thereon, an actinic radiation-transmissive, ink-receptive layer between the adhesive layer and the graphic layer, and an application tape over the graphic pattern. The adhesive layer comprises an actinic radiation-responsive composition. Exposure of the article to actinic radiation selectively differentiates the adhesive potential between those portions of the adhesive layer underlying the graphic pattern and the exposed portions of the adhesive layer. After application of the article to a substrate, removal of the application tape causes selective removal of unwanted areas leaving desired graphic pattern on the substrate, i.e., the transfer article if self-weeding.

9 Claims, 2 Drawing Sheets

SELF-WEEDING DRY TRANSFER ARTICLE

TECHNICAL FIELD

This invention relates to a self-weeding, flexible, dry transfer article or decalcomania, and in one embodiment, relates particularly to a low-profile transfer article free of a self-supporting, integral backing film layer.

BACKGROUND ART

One form of dry transfer material includes an adhesive layer applied to one surface of a permanent, continuous, self-supporting base film and one or more ink layers distributed in a graphic pattern on the opposing face of the base film. The fil provides a substrate for the ink and adhesive, and maintains the two permanently separated so as not to contaminate one with the other. Also, because of the relatively thick, self-supporting nature of the film, the transfer article is storable and handleable without substantially wrinkling, cracking, or the like. Along with the advantages conferred by the presence of the base film are certain disadvantages, principally cost of the film, and the substantial thickness its presence imparts to the transfer article. This latter feature creates both aesthetic and performance drawbacks. Aesthetically, the high profile of the transfer article relative to the surface of the substrate to which the article is affixed may create an artificial appearance. From a performance standpoint, the higher profile increases the likelihood that the transfer article will be lifted at the edges allowing foreign matter to invade the space between the substrate and the transfer article, causing further erosion of the adhesive bond. Reducing the base or support film thickness leads to a reduction in the advantages sought to be achieved by the film.

Another form of transfer article eliminates altogether the support or base film, providing a marking as thin as 10 to 40 microns. Such an article approximates painted markings in aesthetics. However, elimination of the base film imposes such substantial restrictions on both the manufacturing techniques required to construct such an article and the materials which can be utilized in the construction as to militate against adoption of this form for many uses, particularly where rigorous environmental conditions may be encountered. Among the manufacturing restrictions are the need to reverse print the graphic design (for two color printing, the second layer must be printed before the first ink layer) and the dependence upon selective techniques for applying the adhesive (silk screening or gravure printing rather than roll coating). In terms of material restrictions, a principle one is that the adhesive is generally a latent type, for example, a water-soluble or solvent activated adhesive. This in turn requires that an adhesive actuation step be introduced into the bonding procedure, adding additional time, difficulty, and skill demands to the use of this type of decal. Such support film-free graphics are also generally more brittle and less tough, restricting if not eliminating the type of cutting and trimming operations which are employed with conventional film-based graphics to provide the finished decal pattern and remove waste.

U.S. Pat. No. 4,454,179 (Bennett et al.) describes a dry transfer article that includes a carrier film bearing a graphic design in the form of a predetermined ink pattern. An actinic radiation-sensitive adhesive overlaps the ink pattern. The ink pattern acts as a mask to the radiation so that only adhesive in non-ink areas is exposed to radiation. This creates a differential adhesive tack which allows the transfer article to be positioned on a substrate and the carrier film and exposed adhesive selectively removed, leaving the graphic design and underlying unexposed adhesive bonded to the surface. This patent describes articles made by reverse printing. Additionally, it describes the direct application of the graphic to the carrier. Generally, only low adhesive forces hold the graphic to the carrier. This can lead to difficulty when the transfer article is subsequently positioned or repositioned on a substrate, as the graphic may release prematurely from the carrier.

U.S. Pat. No. 4,514,457 (Sasaki) describes a transfer article having an adhesive layer, a coating of particles on one surface of the adhesive layer which provides an ink-receptive surface, and a graphic image on the particle layer. A binder is preferably employed with the particle layer so as to prevent migration of adhesive through the particle layer into the graphic image layer. The adhesive employed is preferably a room temperature, pressure-sensitive adhesive, although a heat-sensitive adhesive may be used.

DISCLOSURE OF THE INVENTION

The present invention provides a transfer article which comprises an actinic radiation-responsive adhesive, a graphic layer comprising a predetermined graphic pattern, and an ink-receptive layer interposed between the adhesive layer and the graphic layer. The article is of unitary construction, and, in some embodiments, may have a low profile and be free from a permanent, self-supporting film layer. An overcoat may further be applied to the transfer article over the graphic layer.

BRIEF DESCRIPTION OF THE DRAWINGS

The invention is illustrated by the accompanying drawings wherein.

These figures, which are not to scale, are illustrative only and are intended to be nonlimiting.

DETAILED DESCRIPTION

Figure 1:
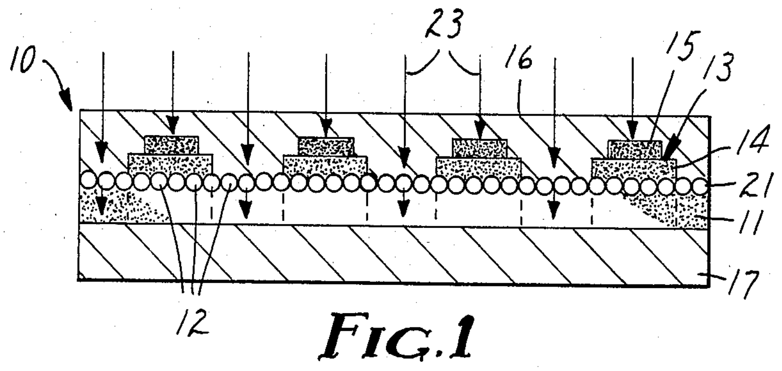
FIGS. 1, 3, and 5 are enlarged cross-sectional views of alternative embodiments of the dry transfer article of the invention with associated optional temporary release liner.

Referring to the drawings, and particularly FIG. 1, dry transfer article 10 includes an adhesive layer 11, overlying which is ink-receptive layer 21 composed of particles 12. Overlying layer 21 is a graphic layer 13 composed of a first ink 14 and a second ink 15. Covering layer 13 and the exposed, i.e., not covered by ink, portions of ink-receptive layer 21 is an overlayer or clear coat 16. Dry transfer article 10 is applied to liner 17, a conventional release liner such as a silicone coated release paper which covers adhesive layer 11 prior to application to the desired substrate.

Figure 2:
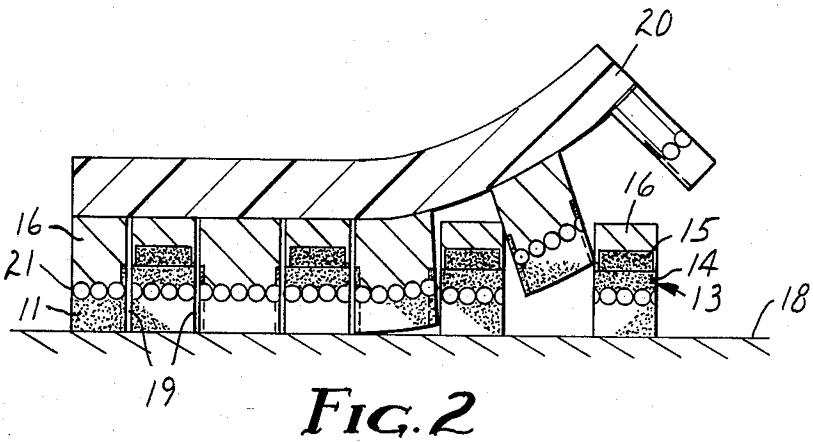
FIGS. 2, 4, and 6 are enlarged cross-sectional views of the dry transfer articles of FIGS. 1, 3, and 5, respectively, bonded to a substrate after having been exposed to actinic radiation, kiss cut, and having an application tape applied thereto.

In FIG. 2, the transfer article of FIG. 1 (with release liner 17 previously removed) is bonded to a substrate 18 after having been first exposed to actinic radiation, kiss cut as shown at 19, and having had application tape 20 applied to clear coat 16. As shown, application tape 20 is in the stage of partial removal. Application tape 20 serves as an aid to application of the transfer article to the substrate and permits handling of transfer article 10, which otherwise is subject to wrinkling owing to its very thin, flexible construction. After application of article 10 to the substrate, application tape 20 is removed and discarded. A low-profile graphic image remains on the substrate. During this operation, the exposed adhesive is also removed, thereby rendering the article 10 self-weeding. If pressure or heat is required to provide the necessary bonding to substrate 18, tape 20 can serve as the contact surface for such forces to prevent damage to transfer article 10 before it is securely adhered to and supported by substrate 18.

Transfer article 10 may be manufactured by a variety of conventional techniques, which is one of the advantages of the invention. A typical procedure is to apply adhesive layer 11 to release liner 17 by a roll or knotch bar coating operation. After drying the adhesive to remove solvent or the like, particles 12 of layer 21 are applied to the exposed surface of adhesive layer 11 by an electrostatic coating process or by a gravitational technique, which insures that the particles are sufficiently proximate to one another to provide an ink-receptive surface. Preferably, the application technique provides a substantially uniform, coplanar, monolayer coating of particles. The individual particles are most preferably touching adjacent particles, i.e., contiguous. If a binder, e.g., a resin (not shown), is included in the construction of the ink-receptive layer, it may be applied as a slurry or the like with particles 12 or as a solution to layer 21 coated with the particles 12 such that the binder flows between adjacent particles 12 to form a matrix which joins adjacent particles 12. After removing any liquids present as a result of applying particles and/or binder, the first and second inks 14 and 15, respectively, are then applied to layer 21. Ink application can be accomplished by a variety of printing techniques, including silk screening, gravure printing, and off-set printing.

Following application of the graphic design, which may consist of one or a plurality of inks applied sequentially in forward rather than reverse order, an ink-protective overlayer or clear coat 16 may be applied, if desired, by conventional coating techniques including gravure or silk-screen printing. Clear coat 16 should preferably be continuous over the surface of the graphic design and be such as to allow detection, generally visual detection, of the underlying design. Clear coat 16 is most often a resin transparent to visible light and must be transparent to actinic radiation.

FIG. 1 further illustrates that transfer article 10 is exposed to actinic radiation (depicted by arrows 23) from the direction of the ink-bearing surface of the ink-receptive layer 21. Graphic layer 13 masks passage of the actinic radiation to those segments of adhesive layer 11 underlying the ink. The actinic radiation passes through those portions of the article not containing ink and initiates a chemical reaction within the adhesive composition which results in reducing the adhesive potential to the substrate to which the article is to be applied relative to the adhesion potential to such substrate of masked or unexposed adhesive segments.

Referring to FIG. 2, after being exposed to actinic radiation, the resulting product is kiss cut at 19, and then an application tape 20 is applied. After removal of release liner 17, the article may then be applied to the surface of substrate 18 with pressure such as is exerted by a hand drawn squeegee. Development is accomplished by applying a peeling force to application tape 20. The adhesion between the surface of substrate 18 and those adhesive segments underlying the ink exceeds the adhesion between the surface of substrate 18 and the adhesive segments which have been exposed to actinic radiation.

Kiss cutting is typically carried out by die cutting the construction from the direction of the ink-bearing surface of the ink-receptive layer 21 according to the outline of the ink image 14 trimming the same in imagewise fashion if desired, down to the surface of the release liner 17. Thus, the release liner 17 may be partially cut, or the cut may not reach the surface of the liner. Alternatively, kiss cutting may be eliminated entirely. In the latter instance, the differential adhesion described above permits the article to cleave along the outline of the ink portions.

Figure 3:
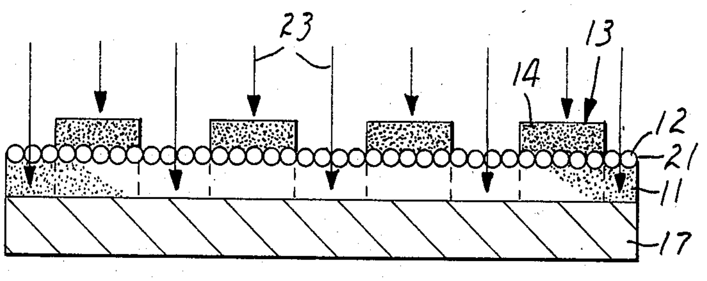
Figure 4:
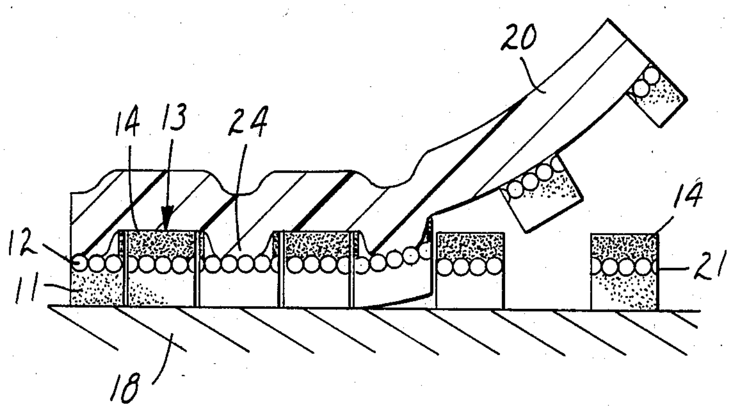

FIGS. 3 and 4 show an alternative embodiment of the invention wherein no clear coat is utilized. Thus, the construction comprises an adhesive layer 11, an ink-receptive layer 21 composed of particles 12, graphic layer 13 composed of first ink 14 and release liner 17.

In FIG. 4, application tape 20 has been applied so that at least a portion 24 of the tape contacts the exposed portions of ink-receptive layer 21 outside of the ink areas 14. This may be accomplished by either pressure lamination or burnishing. Before tape 20 has been applied, the resulting product is exposed to actinic radiation (depicted by 23 in FIG. 3) and optionally kiss cut. It is then applied to substrate 18 as described above.

Figure 5:
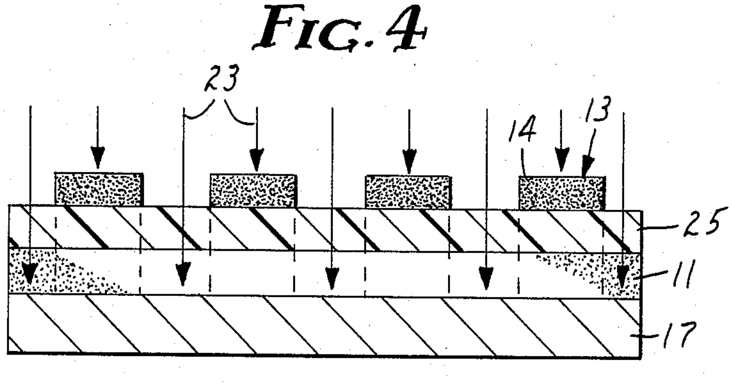
Figure 6:
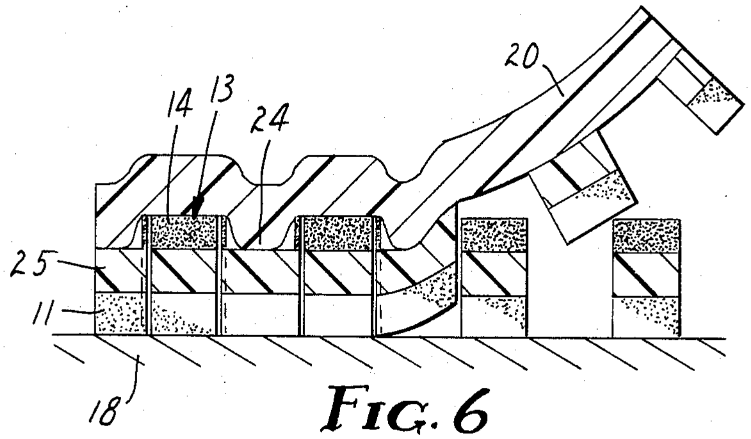

FIGS. 5 and 6 show yet another embodiment of the invention wherein the particulate ink-receptive layer has been replaced with a non-particulate ink-receptive layer 25.

The transfer article of the present invention, with or without the optional clear coat, can be provided with an overall thickness of 40 microns or less, i.e., having a low profile, if desired. The adhesive layer generally ranges from 5 to 30 microns, and the ink-receptive layer from 500 angstroms to 20 microns (preferably from 1 to 5 microns). When the ink-receptive layer comprises individual particles, they typically range from 10 angstroms to 5 microns in major dimension. The particles may be provided as a monolayer or multi-layers. The overall thickness of the ink layer depends upon a variety of factors including the number of sub-layers which are present. In general, the overall ink layer ranges in thickness from 0.5 to 30 microns.

A wide variety of adhesives may be employed in the practice of the invention. They are either inherently responsive to actinic radiation or are made so prior to exposure to such radiation by introduction of an actinic radiation-responsive material into the adhesive layer. For example, an actinic radiation-responsive overlayer may be employed which will pass through the ink-receptive layer where no ink has been applied but will be blocked from such passage where ink has been applied. In general, it is desirable that the adhesive be water-proof, heat-resistant and weatherable. The adhesive layer typically ranges from 5 to 15 microns and more generally from 10 to 15 microns in thickness. While the adhesive layer may be patterned or continuous, the latter is generally the case.

Adhesive compositions which are inherently responsive to actinic radiation contain one or more ingredients capable of responding to actinic radiation so as to cause the composition to have reduced tack and increased cohesive strength relative to portions of the composition which have not been exposed to actinic radiation.

Examples of useful adhesives in this regard are pressure-sensitive polyacrylate adhesives and natural rubber adhesives such as are disclosed in U.S. Pat. No. Re 24,906 (Ulrich); and thermoplastic rubbery adhesives containing a rubbery block copolymer of the A-B-A type wherein A represents a thermoplastic polymer block and B represents an elastomeric block. These materials may be modified, if necessary, to incorporate an effective amount (e.g., 0.5–5% by weight) of an actinic radiation-responsive material such as a free radical initiator.

Yet another class of useful adhesive compositions are those described in U.S. Pat. No. 4,454,179 at column 6, line 17 to column 7, line 14 and its examples. This disclosure is incorporated herein by reference.

Adhesive compositions which are not inherently responsive to actinic radiation include those listed above which are free from actinic radiation-responsive components. However, they must be capable of being penetrated by the necessary actinic radiation-responsive material.

The ink-receptive layer must enable actinic radiation to pass therethrough. Additionally, it must permit passage of at least the actinic radiation-responsive component of the clear coat when a normally actinic radiation-non-responsive adhesive is used. In this regard it has been found that the ink-receptive layer is preferably 5 microns (most preferably 3 microns) or less in thickness. Thicker ink-receptive layers may be employed, but it has been found that thick layers reduce the ability of the actinic radiation-responsive material to pass through to the adhesive layer.

When particulate material is utilized as the ink-receptive layer it is preferred that the particles be of a size and shape sufficient to provide an appropriate substrate in terms of uniformity in surface smoothness for the desired graphic design. As a general rule, the finer the resolution demands for the graphic design, the smaller should be the particles and the more compactly placed across the surface of layer 11. Particle sizes ranging from about 0.1 to about 5 microns, most preferably 0.2 microns to 3 microns, may be utilized. The particle may be regular or irregular in shape, although the former is preferred. Spherical or flat (scale-like) shaped particles of substantially uniform size are most desired, especially when the particle-containing layer also includes a binder. Suitable materials of which the particles may be made are a variety of synthetic and naturally occurring substances, including glass, silica, volcanic ash, mica, plastics and metals and combinations thereof.

Binders which may be used in the particulate ink-receptive layer include any material which is compatible with the particles, adhesive, and ink employed in the construction of the transfer article. The material is generally a resin, typically a multi-purpose urethane resin or an acrylic resin.

The binder (which generally ranges from 0 to 50% by weight of the total weight of the ink-receptive layer) may be applied together with the particles as a slurry or separately from the particles. The binder should be sufficient in quantity to fill any voids between adjacent particles to provide a barrier to migration of adhesive through the layer into the ink-containing layer. In those cases when binder is not present, preferably at least 50% of the surface area of the ink-receptive layer is covered by particles, more perferably 80% and most preferably as much as 95% up to 100%, although the latter limit is difficult to achieve in practice. When binder is present in the particle-containing ink-receptive layer, preferably at least 50% of the surface area of the layer should be occupied by particles, more preferably 75%, and most preferably 90% or more.

Non-particulate ink-receptive layers useful in the invention may be selected from any organic resin capable of forming a suitably ink-receptive surface and which are compatible with the adhesive and the ink. Examples of useful resins include vinyl resins, polyester resins, urethane resins, polypropylene resins, acetate resins, and the like. They may be applied to the adhesive from a liquid solution and dried or, alternatively as a dry film. Preferably, the adhesive used in this construction is inherently actinic radiation-responsive.

Types of ink which may be employed include solvent-based inks, multi-component chemically reactive inks, and actinic radiation-curable inks. Solvent-based inks utilize a polymeric binder such as polyvinyl chloride or acrylic resin which is dissolved in a suitable solvent, printed on the desired surface, and dried. In multi-component, chemically reactive systems, reactive components are dissolved or dispersed in a suitable liquid medium, printed, solvent evaporated and then cured by the reaction of the reactive components. A typical multi-component, chemically reactive system involves a co-reactive polyol resin and polyisocyanate to yield a polyurethane ink. Actinic radiation-curable ink systems entail use of reactive prepolymers and monomers such as urethane-acrylates responsive to actinic radiation, generally ultraviolet light, to effect curing. The ink may contain a polymeric component, preferably a high tensile strength polymer or resin such as polyvinyl butyral, cellulose nitrate, cellulose acetate, alkyds and alkyds modified or copolymerized with drying oil; styrene, urethane, vinyl, acrylic resin, polyvinylhalides, polyurethanes, urethane-acrylates, epoxy polymers, epoxy-phenolic, epoxy-polyamide and catalyzed epoxy resins and copolymers; urea-, melamine-, and benzo-guanamine formaldehyde polymers; chlorinated and isomerized rubber, polystyrene and polyvinyl toluene; polyacrylates, polymethacrylates and thermosetting acrylic resins. The ink may be applied as a solution, dispersion or emulsion in organic solvent medium or water, the solvent or water being removed after application. Any convenient pigment well known for use in printing inks may be used in the ink formulations of the present invention including pigments modified by coating the pigment particles with surface active agents to improve dispersibility and increase covering power.

The ink may be applied by a variety of conventional coating or printing techniques. Screen printing is a preferred technique. The ink graphic can be a mono-layer or multicolored layers.

The ink is opaque to the actinic radiation to which the adhesive is responsive. Opacity in the context of this invention means that the ink, as deposited, will block passage of sufficient actinic radiation relative to those portions of the adhesive layer free of ink such that a latent pattern defined by chemically reacted and unreacted adhesive is provided which can be physically developed. Preferably the ink is at least 50% opaque.

The optional clear coat provided so as to protect the surface of the ink from, for example abrasion, comprises an actinic radiation-transparent material, which means that it permits sufficient actinic radiation to pass through the clear coat to effect the reduction of tack in the exposed adhesive layer. The clear coat may also be, and preferably is, actinic radiation-responsive. Generally it ranges from about 10 to about 30 microns, and should be at least 6 microns, thickness.

If the adhesive layer is not inherently responsive to actinic radiation, an actinic radiation-responsive overcoat capable of passing through the ink-receptive layer and penetrating the adhesive layer can be employed. A wide variety of such compositions may be used. They include oligomers containing polyester polyol/polyisocyanate compositions, aliphatic urethane acrylate compositions and the like. Generally, this coat is at least 6 microns thick to provide a sufficient amount of material for penetration into the adhesive layer.

Liner 17 and application tape 20 may be any conventional sheet-like material which will temporarily adhere to the surface with which it is associated and be removable therefrom completely and without damage to the transfer article itself. In the case of the release liner 17 associated with the adhesive layer, a silicone-coated release liner is suitable. Tape 20 is typically a film or paper coated with a pressure-sensitive adhesive which will provide a non-aggressive bond to the surface of the article it covers.

The invention will be further described by the following illustrative examples in which all parts and percentages are by weight unless otherwise stated.

EXAMPLE 1

An adhesive was prepared by adding 0.5 parts by weight of a cross-linking agent (CORONATE L, trade name for a product of Nippon Polyurethane K.K.) to a copolymer consisting of 100 parts by weight of butyl acrylate and 5 parts by weight of acrylic acid. The adhesive was roll-coated on silicone-coated release paper and dried at 100° C. for 3 minutes (dry thickness 10 microns). Fine particles of sodium glass having an average particle diameter of 1 micron were uniformly coated on the adhesive layer by an electrostatic coating process. The coverage was essentially a monolayer of contiguous particles having a thickness of from 3 to 5 microns.

An acrylic resin (PARALOID C-10LV, trade name for a product of Rohm and Haas Co.) was diluted about 20 times with toluene and the solution was thinly coated (about 2 grams per square meter dry weight) on the fine particle layer by a curtain coating process and dried at 120° C. for 3 minutes. The acrylic resin filled the interstitial spaces between the sodium glass particles.

A graphic pattern was printed on the particle-containing layer by silk-screen printing using a vinyl chloride type ink (SCOTCHCAL Brand 3915, trade name for a product of Minnesota Mining and Manufacturing Company, hereinafter "3M") and dried at 65° C. for 30 minutes.

An ultraviolet (UV) light responsive overcoat was then applied over the ink and particulate surface from an acrylic polyurethane composition of the formula:

| Formulation | Parts |
|---|---|
| Polyurethane Acrylate Oligomer | 55.0 |
| Trimethylpropanetriacrylate | 11.0 |
| N—Vinylpyrrolidone | 15.0 |
| 2-Ethylhexyl Acrylate | 8.0 |
| 2,2-Diethoxyacetophenone | 5.0 |
| Dimethylaminoethanol | 2.0 |
| Multiflow (Trade name for a product of Monsanto Industrial Chemical Co.) | 1.0 |
| FC-431 (Trade name for a product of 3M) | 1.0 |
| T-292 (Trade name for a product of Ciba-Geigy Corp.) | 1.0 |
| 2N—Naphthenate | 1.0 |

The acrylic polyurethane composition was dried to provide a 15 micron thickness layer and the resulting construction was then exposed to UV light from a UBO 451-5 AM UV unit made by Eye Graphic Company at a distance of 160 centimeters and a running speed of 5 meters per minute. The UV light source was a 120 watt per centimeter metal halide lamp.

The irradiated construction was then kiss cut at from 0 to 1 millimeter inside the outer edges of the ink areas down to the silicone release-paper and an application tape (SCOTCHCAL Brand SCPM-3, trade name for a product of the Sumitomo 3M Ltd.) was laminated to the overcoat.

To apply the article, the release paper was removed from the transfer article and the article was sufficiently press-bonded to the substrate, a painted steel panel, by a squeegee applied to the application tape. The application tape was peeled away, leaving a graphic design-marked surface which had the feel and appearance of paint. Additionally, the article was self-weeding.

EXAMPLE 2

Example 1 was repeated except that no resin was included in the ink-receptive layer and the particulate material used was a benzo-guanamine formaldehyde resin (EPOSTER SU-7, trade name for a product of Nihon-Shokubai Kagaku Kogyo Co.) having an average diameter of 10 microns.

The resultant article provided results equivalent to those of Example 1.

EXAMPLE 3

Example 1 was repeated with the following modifications:

Adhesive: Pressure sensitive, actinic radiation-responsive adhesive (SU-104, trade name for a product of Tao-Gosei Kagaku Kogyo Co.).

Particles: Benzo-guanamine formaldehyde (EPOSTER SU-7)

Binder: None

Graphic Pattern: Vinyl Chloride Ink (SCOTCHCAL Brand 3916, trade name for a product of 3M)

Overcoat: None

Irradiation: Running speed of 2.5 meters per minute.

After application to a painted steel substrate and removal of the application tape as in Example 1, the graphic remained on the substrate and had the look and feel of paint. The article was self-weeding.

EXAMPLE 4

Example 3 was repeated with the following modifications:

Graphic Pattern: Vinyl Chloride Ink (SCOTCHCAL Brand 4103, trade name for a product of 3M)

Overcoat: Acrylic Polyol Polyurethane

Irradiation: Running speed of 3 meters per minute.

After application to a painted steel substrate and removal of the application tape, the graphic adhered to the substrate and had the look and feel of paint. The article was self-weeding.

EXAMPLE 5-7

Example 1 was repeated except that 30 micron thick layers of SU-104 adhesive were employed, non-particulate ink-receptive layers were employed, no overcoats were employed, and SCOTCHCAL Brand 3915 and 3920 Screen Printing Inks (trade names for products of 3M) were employed as the graphic patterns. Additionally, the articles were heated at 75° C. for 1 hour after application of the ink. Table 1 lists the ink-receptive layers employed.

TABLE 1

| EX. | INK-RECEPTIVE LAYER | THICKNESS |
|---|---|---|
| 5 | Polyvinyl chloride (C-16527, trade name for a product of Bando Kagaku Co.) | 50 microns |
| 6 | Polyester (SM-5, trade name for a product of DIA Foil Co.) | 50 microns |
| 7 | Polyvinyl chloride (APONIL P, trade name for a product of Okamoto-Riken Kogyo Co.) | 50 microns |

After application to a painted steel substrate and removal of the application tape, each graphic was adhered to a substrate and had the look and feel of paint. Each article was self-weeding.

The transfer article of the present invention enjoys the advantages of both self-supporting film-containing and film-free transfer articles. Wrinkling and cracking are reduced substantially. Warping due to the presence of a base film is eliminated. The transfer article of the present invention can be constructed utilizing conventional, efficient, high speed coating techniques and materials which are economical, durable, and convenient. The aesthetics of low-profile, paint-like appearance are achieved. The transfer article with the release liners in place can be formed into a roll for shipping, storage, and dispensing. Dependence upon latent, activatable adhesives is eliminated.

Various modifications and alterations of this invention will become apparent to those skilled in the art without departing from the scope and spirit of this invention.

What is claimed is:

1. A dry transfer article comprising an adhesive layer, a graphic layer comprising a predetermined graphic pattern, an actinic radiation-transmissive, ink-receptive layer between said adhesive layer and said graphic layer, wherein said adhesive layer is actinic radiation-responsive.

2. The article of claim 1 wherein said adhesive layer is pressure-sensitive.

3. The article of claim 1 further comprising an overlayer on said graphic layer and the exposed portions of said ink-receptive layer.

4. The article of claim 3 wherein said overlayer comprises an actinic radiation-responsive, actinic radiation-transmissive layer.

5. The article of claim 4 wherein said overlayer passes through said ink-receptive layer and penetrates said adhesive layer responsive to actinic radiation.

6. The article of claim 3 further comprising an application tape on said overlayer.

7. The article of claim 1 wherein said ink-receptive layer comprises a layer of discrete, inert particles being sufficiently proximate to one another to present an ink-printable surface.

8. The article of claim 1 wherein said ink-receptive layer comprises a non-particulate organic resin layer.

9. The article of claim 1 further comprising an application tape on said graphic layer and the exposed portions of said ink-receptive layer.

* * * * *